Oct. 28, 1958     H. S. PARDEE     2,857,927
VALVE CONSTRUCTION
Filed Aug. 18, 1954
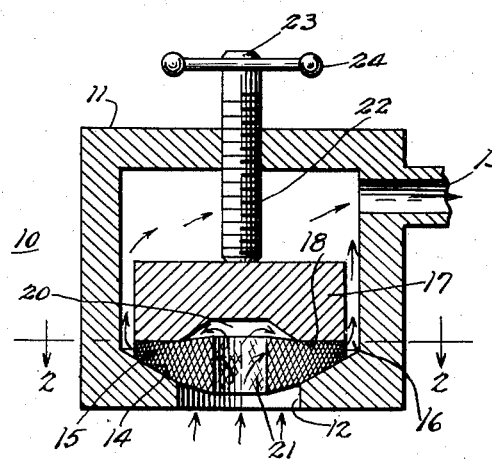
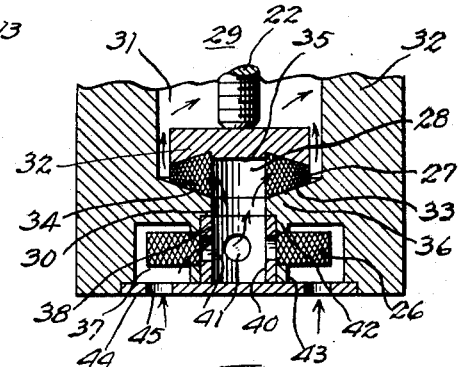
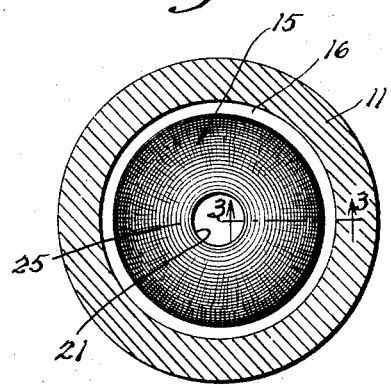
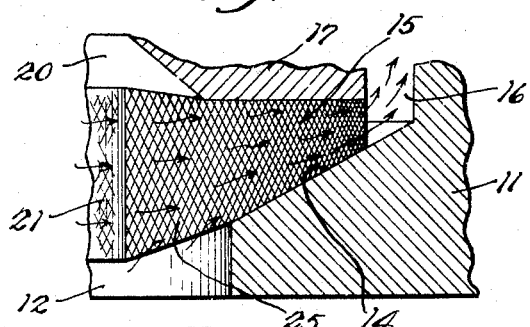
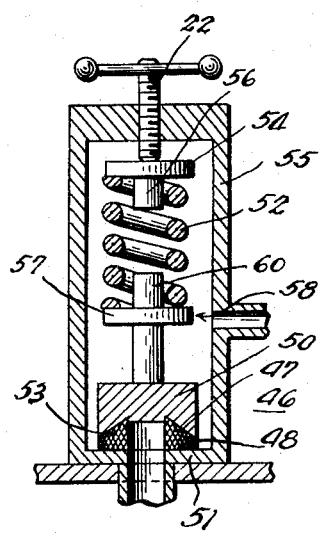
INVENTOR.
Harvey S. Pardee

United States Patent Office 2,857,927
Patented Oct. 28, 1958

2,857,927

VALVE CONSTRUCTION

Harvey S. Pardee, Highland Park, Ill., assignor to The Creamery Package Mfg. Company, Chicago, Ill., a corporation of Illinois Application August 18, 1954, Serial No. 450,764

7 Claims. (Cl. 137—549)

This invention relates to an homogenizing apparatus and more particularly to a valve therefor which is utilized for homogenizing liquid dispersions, such as milk or the like which contain globules of various sizes dispersed within a given serum. In the homogenization of milk, for example, it is the function of the apparatus and more particularly the valve therefor, to break up the large fat globules into sizes smaller than about two microns (0.00008 inch) in diameter, which globules do not rise within the serum to form a layer, when the milk is in a quiescent state.

Various homogenizing valves have heretofore been proposed to perform the above-indicated function with but limited success. One such valve was a spring-held poppet type wherein the product was forced, under extremely high pressure, to pass through a restrictive passageway formed between the valve piece and the seat therefor. The desired breakup of the globules with such a valve was ineffectual because of the appreciable number of globules which passed unaffected through the restricted passageway, thereby resulting in an inefficient use of power.

A second type of valve heretofore proposed was formed of a heterogeneous mass having a plurality of interconnected minute passageways of random size and shape through which the product under high pressure was forced to flow. With this type of valve, relatively large portions thereof were ineffective in performing the homogenizing action because of the low velocity of the product in such portions. Furthermore, where the mass was compressed or molded into a particular shape, such, for example, as a cone, so that the valve member was properly retained within the valve seat, numerous sections of the valve were largely bypassed by the product flowing in short circuit paths or passageways. Other shortcomings associated with this latter type of valve will become apparent from the discussion to follow hereinafter.

The theory of operation of the last-mentioned valve construction was that the comminution of the fat globules in the milk product was effected by the globules being squeezed through the minute interconnected passageways whereupon the large globules were subjected to a shearing action. This theory of operation is questioned, however, by reason of the fact that a vast majority of the passageways, while of minute size, are considerably greater in size than the largest globule diameter with the result that the shearing action on the globules is relatively slight. It is believed the more accurate theory of operation by which comminution of the globules is effected is by smashing or impact fission of the fast moving globules against the sides of the passageways and by collision between the globules themselves.

Furthermore, the product, as it flows through the interconnected minute passageways of the heterogeneous mass type of valve, is separated into numerous tortuous streams wherein the flow of the product is rapidly deflected at every turn. At each turn, there is a change in velocity of the product stream with a consequent loss in velocity head and a total or partial conversion of the kinetic energy of the stream into heat. After the product has passed through the valve, the initial velocity head of the stream which was created by the pump pressure, is reduced materially to approximately zero as evidenced by the fact that the velocity and pressure of the product upon leaving the valve is small. Velocity head is mathematically defined by the formula, $$\frac{(\text{velocity } V)^2}{2(\text{gravity } G)}$$

and is proportional to the square of the velocity at any given point, and thus the velocity head is very high at the points of high velocity and very small at points of low velocity. The smashing effect, on the other hand, is proportional to the kinetic energy of the moving globule which likewise is proportional to the square of the velocity. Thus, based on this fact, the most effective and a substantial portion of the homogenizing action occurs within the passageways disposed adjacent the surface portions of the valve first contacted by the product moving at high velocity. On the other hand, little or no homogenizing action takes place within the remaining passageways because of the severe loss in velocity of the product. For this reason, therefore, it is desirable to have all the passageways formed in the mass substantially uniform and as near to optimum size as possible.

Where the heterogeneous mass type of valve is cone shaped and positioned on the valve seat with the vertex of the cone pointed against the direction of flow of the product, the apex portion of the cone encounters the product at its greatest velocity and thereby results in this portion of the valve effecting the greatest homogenizing action. As the passageways diverge through the angle of the cone, their transverse areas and numbers increase while the velocity head decreases as the square of the total area increases. The flow of the product is initially in an axial direction through the valve and then gradually outwardly so at the discharge end it is in a radial direction out through the side portions of the cone. Near the base or discharge side of the cone the homogenizing action practically ceases by reason of the reduced velocity of the product. Thus a considerable portion of the cone mass, particularly in the interior center and base, provides little, if any, homogenizing action and therefore may be considered as serving no useful function, but instead provides resistance to product flow and therefore represents a waste of power.

Where the heterogeneous mass is formed of random convolutions of a strand or strands of wire and is compressed into a particular shape, such as a cone, the density of the mass will be increased to about 50 percent of the solid wire and hence the total volume of the passageways or interstices thereof is about one-half the volume of the valve. The interstices, however, vary in size from zero to a maximum with a random size distribution; in some places the wires being in parallel contact and, in others, relatively wide apart. It is a statistical certainty that some of the larger holes will line up in the direction of flow to form tunnels part way through the mass through which the product flows freely and is poorly homogenized. The lengths of such tunnels must be only a small fraction of the total flow path to insure proper homogenization. Thus, with the heterogeneous mass type of valve most of the flow paths are made longer than necessary for good homogenization so that part of the product is over-homogenized and part is under. This condition wastes power and lowers the homogenizing efficiency.

In any heterogeneous mass type of homogenizer valve the product passes in series through many openings with a rather small probability that a particular globule will be smashed at any one opening. It is therefore statistically certain that some of the globules will pass through without breakup and homogenizing efficiency is surely less than 100 percent. However, the probability can be made as near to 100 percent as desired by lengthening the path, i. e., by increasing the number of openings in series. The pumping power is proportional to the length of the path and it is desirable to have that length no longer than necessary to effect the desired homogenization. After a globule is once broken the flow through the remainder of the path only wastes energy.

The ideal condition is to obtain the desired degree of homogenization with the minimum power consumption, i. e., with the minimum pressure drop across the valve. There is but one optimum set of conditions which will give this and it should prevail throughout the body of the valve so that all parts of the valve will be worked with maximum efficiency. Most of the homogenization will take place near the valve entrance where the large globules are most plentiful. As the flow progresses the openings should be made progressively finer to catch the remaining large globules that manage to get through by chance. At any one level or radial distance the openings or passageways should be of substantially the same size and shape and they should not be so aligned as to form tunnels or short circuits. The product flow streamlines should all be of substantially the same length, have substantially the same velocity, be as short as possible to minimize power requirements, and yet be long enough to provide sufficient opportunity for breakup of the globules.

Thus, it is an object of this invention to provide a homogenizing valve which effects optimum homogenizing action with a minimum expenditure of power.

It is a further object of this invention to provide a homogenizing valve which is sturdy and compact in construction and wherein the whole of the valve provides homogenizing action on the product flowing therethrough.

A still further object of this invention is to provide a homogenizing valve wherein the flow of the product therethrough is substantially in a radial direction thereby requiring a smaller pressure to be utilized in retaining the valve in proper seating position when the latter is under operating conditions.

Further and aditional objects will appear from the description, accompanying drawings, and appended claims.

In accordance with one embodiment of this invention, a valve construction is provided comprising a valve member formed of a strand of resilient material wound uniformly about a given axis to define a body having an axial opening and a plurality of interconnected minute passageways extending in substantially a radial direction therefrom. Each of said passageways is, at a given radial distance from the axis of the valve member, of substantially uniform shape, size, and length and is adapted to permit substantially uniform velocity therethrough of the product to be homogenized. The contour of the sides of the valve member conforms substantially to the shape of the valve seat upon which the valve member is positioned. The axial opening of the valve member is disposed in registration with the intake port communicating with said valve seat. The valve member is held in position on the valve seat by pressure exerted thereon by a compression block contacting the side of the valve member opposite the intake port for the valve seat. The compression block overlies one side of said valve member and closes off one end of the axial opening thereby requiring the product to flow in a radial direction out through said valve member.

For a more complete understanding of this invention, reference should be made to the drawings wherein:

Figure 1 is an enlarged vertical sectional view of the improved valve construction;

Fig. 2 is a sectional view taken along line 2—2 of Fig. 1;

Fig. 3 is a magnified sectional view of the valve member taken along line 3—3 of Fig. 2;

Fig. 4 is a fragmentary vertical sectional view of a modified form of the improved valve construction; and Fig. 5 is a vertical sectional view of a second modified form of the improved valve construction.

Referring now to the drawings and more particularly to Fig. 1, an improved homogenizing valve construction or assembly 10 is shown for use in homogenizing liquid dispersions such as milk and the like. The valve assembly 10 comprises a housing 11 provided with an intake port 12 through which the product (milk) under high pressure is caused to flow upwardly into the interior of the housing. Spaced above port 12 and extending sidewise from the housing is a discharge port 13 from which the product, subsequent to the homogenizing action, flows from the housing interior. Circumjacent the intake port 12 and disposed within the interior of the housing is a valve seat 14 which, in this instance, is substantially funnel-shape. Disposed within the housing interior and positioned on the valve seat 14 is a valve member 15, the construction of which will be described in detail hereinafter. It is to be noted, however, that the outer periphery of the valve member 15 is less than the peripheral interior of the housing 11 so as to provide an annular cavity 16 through which the product flows upon leaving the valve member. The valve member 15 is held in proper position on the seat 14 by a compression block 17 formed of solid material and disposed within the housing interior. The block 17 has the periphery of the face 18 thereof, contacting the member 15, of substantially the same peripheral shape as the latter. Block face 18, in this instance, is provided with a center recess 20 which aligns itself with a center opening 21 formed in member 15. Contacting the upper face of block 17 is a tightening stud 22 which is threadably mounted on the housing 11. The exposed end 23 of the stud is provided with a handle 24 to facilitate turning of the stud so as to effect proper compression force being applied on the valve member 15.

The valve member 15 is formed by winding a strand of fine wire or other suitable material about a rotating mandrel having an outside diameter corresponding to the diameter of opening 21. The strand is wound first to form a right- (or left-) hand helix with the turns thereof being uniformly spaced apart. The helix will advance in one direction until the desired thickness of the valve member is reached whereupon the lead of the helix is reversed and a second helix is formed with the turns thereof advancing in an opposite direction. This oscillatory winding procedure is repeated until a valve member 15 is built up which has the desired outside diameter. The overlying helices of the valve member form a plurality of interconnected passageways or interstices which are at any given radius from the center of the member of the same size, shape, and length. The manner in which the overlying helices are disposed relative to one another causes no rectilinear passageway being formed which extends radially from opening 21 to the outer periphery of the valve member. The appearance of the completed valve member 15, before it is subjected to a compression force, resembles that of a conventional cylindrical inductance coil. To prevent unwinding of the member, a short length of the starting end of the strand is initially left unwound or dangling, and after several helices have been formed, it is overlaid the outer helix and then overlapped by the remaining helices. The final end of the strand is threaded back into the valve member or soldered or otherwise secured to the outer periphery of the member.

Because of the annular or ringlike shape of the valve member 15, the passageways become progressively larger in cross section as the radius increases and therefore, in order to prevent a marked drop in velocity of the flowing product due to this fact, the member 15 is compressed progressively more from the center portion to the outer periphery. This is accomplished by having either the valve seat of substantially conic shape and the contacting face 18 of the block planar, the valve seat 14 planar and the block face 18 of an inverted conic shape, as seen in Fig. 5, or both the valve seat and contacting block face nonplanar or of inverse conic shape so that the outer extremities of the opposing faces are relatively closer together than the inner portion, as seen in Fig. 4. Depending upon the opposing faces of the valve seat and compression block and the type of product being homogenized, the seating pressure on the valve member will be a predetermined amount to effect passageways or interstices which become progressively smaller in size and thus results in substantially uniform flow velocity of the product throughout the whole of the valve member. The important advantages derived from such uniform flow velocity were previously discussed. A pictorial representation of the valve member 15 under compression is seen in Fig. 3.

It will be noted that the portion 25 of the member defining the opening 21 is provided with relatively large passageways. This is due to the fact that this portion 25 projects from the valve seat into the intake port 12 and therefore is not subjected to the compressing action of block 17. The principal function of member portion 25 is that of a strainer which prevents large foreign particles from finding their way into the compressed portions of the member where the homogenizing action occurs and cause the latter portion to become clogged. The recess 20 formed in block face 18 enables a portion of the product to enter member portion 25 from the upper side and thus utilize the whole of this portion of the member as a strainer. The size of the center opening 21 may be varied depending upon the amount of the member desired to function as a strainer. Thus, the valve member 15 functions in the dual capacity of a strainer and homogenizer.

In the modified form 29 of the valve construction shown in Fig. 4, a separate strainer 26 and valve member 27 is provided. The valve member 27 is substantially the same as valve member 15 except the center opening 28 is substantially the same dimension as the passageway 30 leading to the compartment 31, formed in the valve housing 32, and in which valve member 27 is disposed. Thus, in valve construction 29, the whole of the member 27 is under compression of block 32. The member-contacting surface 33 and valve seat 34 are nonplanar or of inverse conic shapes so that the outer peripheral portions of the member are of greater density than the portion circumjacent opening 28. The portion 35 of surface 33 is in registration with opening 28 and closes off one end thereof causing the product to flow in substantially radial directions out through member 27. Valve seat 34 is formed on a land 36 which separates the interior of housing 32 into two compartments 31 and 37, which are connected to one another by passageway 30, the latter being formed in land 36. Disposed within compartment 37 is an annular ringlike filter 26 which is adapted to filter out any large foreign particles from the product prior to the latter entering passageway 30. The filter 26 snugly encompasses a bushing 38 which is disposed within compartment 37. The axial opening 40 of the bushing is disposed in coincident relation with passageway 30. A plurality of symmetrically arranged apertures 41 are formed in bushing 38 which communicate with opening 40. The apertures are covered over by filter 26 encompassing the bushing. The filter contacts on one side an annular boss 42 depending from the underside of land 36 and on the opposite side is contacted by a spacer 43 which insures that the filter remains in coaxial relation with respect to the bushing. The spacer encompasses bushing 38. A retaining disc 44 is secured to the bottom side of the compartment 37 and holds the bushing, filter, and spacer in assembled relation within the compartment. The disc 44 is provided with a plurality of symmetrically arranged openings 45 through which the product under full pressure enters compartment 37. The filter 26 may be readily replaced, when clogged up, by removing disc 44 thereby affording access to the filter. A pressure relief valve or warning means, not shown, may communicate with compartment 37 to relieve or indicate any excessively high pressure within the compartment that might develop by reason of the filter becoming clogged.

A second modified form 46 of improved valve construction or assembly is shown in Fig. 5 which is similar to the construction shown in Fig. 1 with the exception of valve member contacting surfaces 47 and 48 of the block 50 and valve seat 51, respectively, and the spring 52 utilized to retain the valve member 53 in proper seating relation with the valve seat. Block 50 is substantially the same construction as block 32 heretofore described for valve assembly 29. The surface 48 of seat 51 is planar and therefore the increased density of the valve member 53 at its outer extremities is effected by the conic shape of surface 47 of the block 50.

The tightening stud 22 of valve construction 46 instead of bearing directly on block 50, as shown in Fig. 1, bears against a floating piece 54 which is disposed within the interior of the hollow housing 55 and rests upon the upper end of coil spring 52. Piece 54 is provided with a depending nub 56 which protrudes axially into spring 52 and maintains the spring and piece in assembled relation. The lower end of spring 52 bears against an annular collar 57 formed on a floating plunger 58. The portion 60 of the plunger 58 disposed above the collar 57 nests inside the spring 52 and prevents disassembly of the spring and plunger. The portion 61 of the plunger 58 beneath collar 57 bears directly against block 50. The force applied by block 50 on the valve member and the tension on the spring 52 is controlled by tightening stud 22. Spring 52 enables the valve member to become unseated if an excessively high pressure should develop within the intake port and thereby prevent damage to the apparatus due to such pressure. Where, however, other pressure-relieving means is provided, the spring 52 may be omitted.

Thus, it will be seen that an improved homogenizing apparatus has been provided which effects optimum homogenizing action with a minimum expenditure of power. Furthermore, the size, shape, and arrangement of the minute interconnected passageways in the valve member are such that the whole of the valve member provides homogenizing action for the product flowing therethrough. The improved valve member serves the dual function of a filter and a homogenizing valve.

While several embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. A valve construction through which a liquid dispersion under pressure is caused to flow to effect homogenization of the latter, said valve construction comprising an annular valve member provided with a center opening, said member being formed from a strand of resilient material of uniform cross section wound about a rotating mandrel to form a plurality of overlapping helices with the spacing between the turns thereof substantially uniform, the advance of each succeeding helix being reversed thereby forming a plurality of interconnected minute passageways extending in substantially radial directions from the center line of said valve member, all of the passageways at a given radius being of substantially uniform size and shape.

2. A valve construction through which a liquid dispersion under pressure is caused to flow to effect homogenization of the latter, said valve construction comprising a valve seat, an intake port for the liquid dispersion communicating with said seat, an annular valve member provided with a center opening, said member being formed from a strand of resilient material of uniform cross section wound about a rotating mandrel to form a plurality of overlapping helices with the spacing between the turns thereof substantially uniform, the advance of each succeeding helix being reversed thereby forming a plurality of interconnected minute passageways extending in substantially radial directions from the center line of said valve member, all of the passageways at a given radius being of substantially uniform size and shape, and a retainer piece contacting said valve member and effecting flow of the liquid dispersion in substantially radial directions through said valve member.

3. The valve construction recited in claim 2 wherein the spacing between the inner portions of the retainer piece and valve seat adjacent the intake port is greater than the spacing between the outer peripheral portions of said retainer piece and valve seat.

4. A valve construction through which a liquid dispersion under pressure is caused to flow to effect homogenization of the latter, said valve construction comprising a valve seat provided with a centrally disposed intake port for the liquid dispersion, a porous annular resilient valve member having one end surface thereof positioned on said seat, said member being provided with a center opening which is aligned with said intake port when said seat and member are in assembled relation, and a retainer piece overlying and contacting the opposite end surface of said valve member to retain the latter in assembled relation with respect to said valve seat, said piece closing off one end of the center opening of said valve member to effect flow of the liquid dispersion only in substantially radial directions from said center opening through said valve member; the valve member contacting-portions of said valve seat and said retainer piece being angularly disposed relative to one another to effect progressively greater density of said valve member from the center opening thereof to the outer periphery thereof, when said valve seat, valve member and retainer piece are in assembled relation.

5. A valve construction through which a liquid dispersion under pressure is caused to flow to effect homogenization of the latter, said valve construction comprising a valve seat having a centrally disposed intake port for the liquid dispersion, a porous annular valve member positioned on said valve seat, said valve member being provided with a central opening aligned with and having an area smaller than that of said intake port, and a retainer piece forcibly contacting said valve member to retain the latter in position on said seat, said piece having the surface thereof contacting said member provided with a center recess communicating with said center opening and being spaced from the portion of said valve member circumjacent the center opening, said retainer piece effecting flow of the liquid dispersion in substantially a radial direction through the portion of the valve member disposed between said retainer piece and valve seat.

6. The valve construction recited in claim 5 wherein the portion of the valve member circumjacent the center opening thereof is out of contact with the valve seat and has a greater porosity than the remainder of said valve member, when such remainder of said valve member is compressed by said retainer piece.

7. A valve construction through which a liquid dispersion under pressure is caused to flow to effect homogenization of the latter, said valve construction comprising a hollow housing provided with two compartments interconnected to one another by a passageway, one compartment being provided with an intake port for the liquid dispersion and the second compartment being provided with a discharge port for the liquid dispersion subsequent to homogenization thereof, a filter disposed within said one compartment through which the liquid dispersion passes upon leaving said one compartment, a valve seat formed in said second compartment and in encircling relation with the end of said passageway, a porous resilient valve member having one end thereof positioned on said valve seat, said valve member being annular in shape and provided with a center opening aligned with the end of said passageway, and a retainer piece disposed within said second compartment and forcibly contacting said valve member to retain the latter on said valve seat, said retainer piece closing off one end of the center opening of said valve member and effecting radial flow of the liquid dispersion from the center opening out through said valve member into said second compartment; valve member contacting portions of said valve seat and said retainer piece being angularly disposed relative to one another to effect progressively greater density of said valve member from the center opening thereof to the outer periphery thereof when said valve seat, valve member, and retainer piece are in assembled relation.

References Cited in the file of this patent
UNITED STATES PATENTS

| | | |
|---|---|---|
| 1,197,403 | Seavy | Sept. 5, 1916 |
| 1,925,786 | Brooks | Sept. 5, 1943 |
| 2,334,263 | Hartwell | Nov. 16, 1943 |
| 2,504,678 | Gardner | Apr. 18, 1950 |
| 2,657,712 | Huston | Nov. 3, 1953 |